United States Patent

[11] 3,601,894

| [72] | Inventors | Susan E. Baturay<br>Andover, N.J.;<br>Gary W. Keegan, Bronx, N.Y. |
|---|---|---|
| [21] | Appl. No. | 12,374 |
| [22] | Filed | Feb. 18, 1970 |
| [45] | Patented | Aug. 31, 1971 |
| [73] | Assignee | The Singer Company<br>New York, N.Y. |

[54] PORTABLE ELECTRIC SHEARING DEVICES
4 Claims, 7 Drawing Figs.

| [52] | U.S. Cl. | 30/228 |
|---|---|---|
| [51] | Int. Cl. | B26b 15/00 |
| [50] | Field of Search | 30/228, 245, 247, 248, 250, 273 |

[56] References Cited
UNITED STATES PATENTS

| 2,085,462 | 6/1937 | Ewing | 30/273 |
|---|---|---|---|
| 2,201,599 | 5/1940 | Trautmann | 30/228 |
| 2,680,292 | 6/1954 | Kaufmann | 30/228 |
| 2,751,940 | 6/1956 | Miller | 30/228 X |

*Primary Examiner*—Robert C. Riordon
*Assistant Examiner*—J. C. Peters
*Attorneys*—Marshall J. Breen, Chester A. Williams, Jr. and Harold Weinstein

ABSTRACT: This disclosure relates to a portable electric shearing device having a pair of offset coacting cutting blades capable of turning about an axis of rotation during operation of said tool whereby the line of cut will correspond to the direction in which the device is moved, whether or not the device is turned bodily in said direction.

PATENTED AUG 31 1971
3,601,894
SHEET 1 OF 2
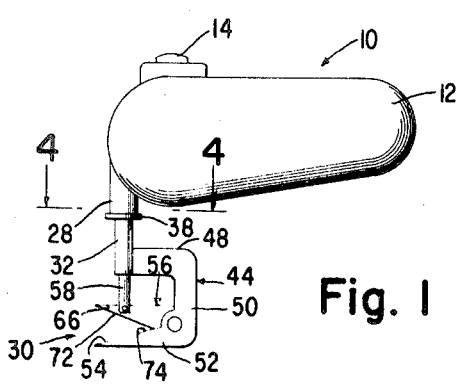
Fig. 1
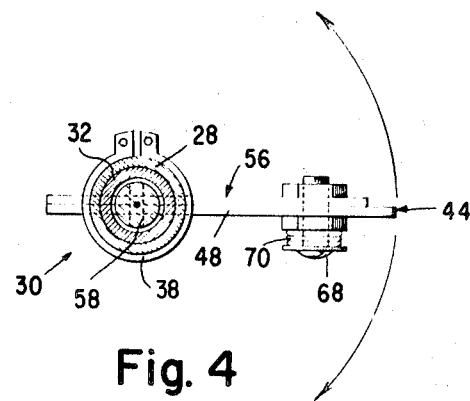
Fig. 4
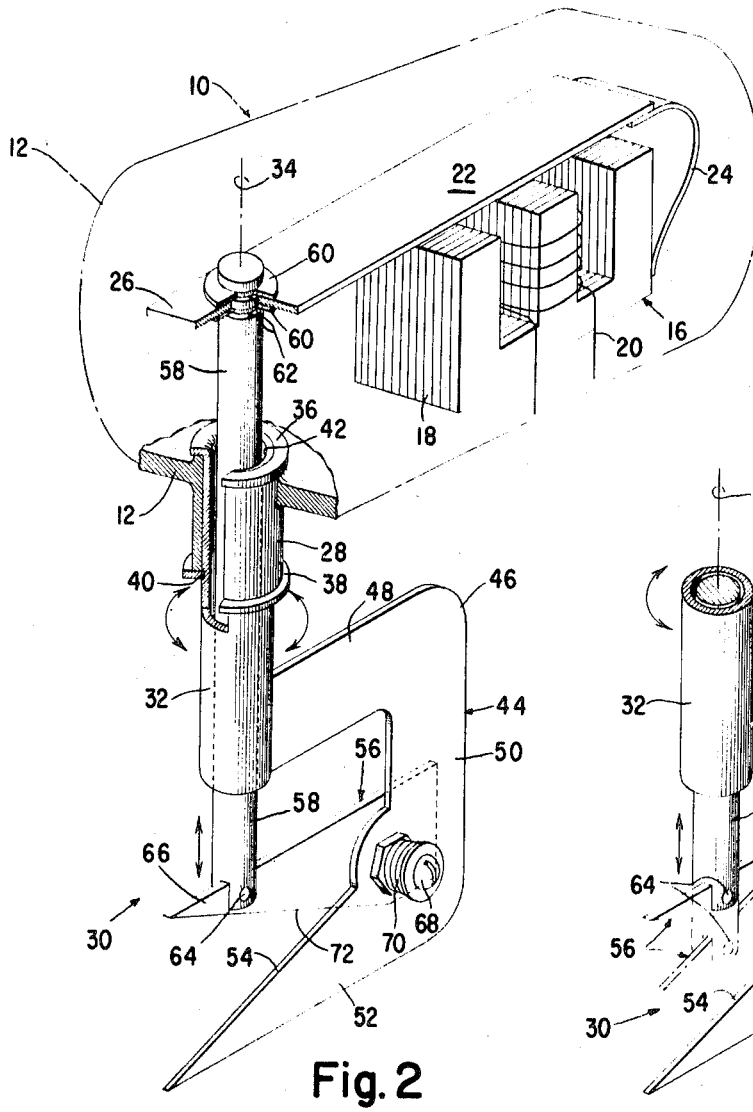
Fig. 2
Fig. 3
INVENTORS.
Susan E. Baturay,
Gary W. Keegan
BY
Marshall J. Breen
ATTORNEY

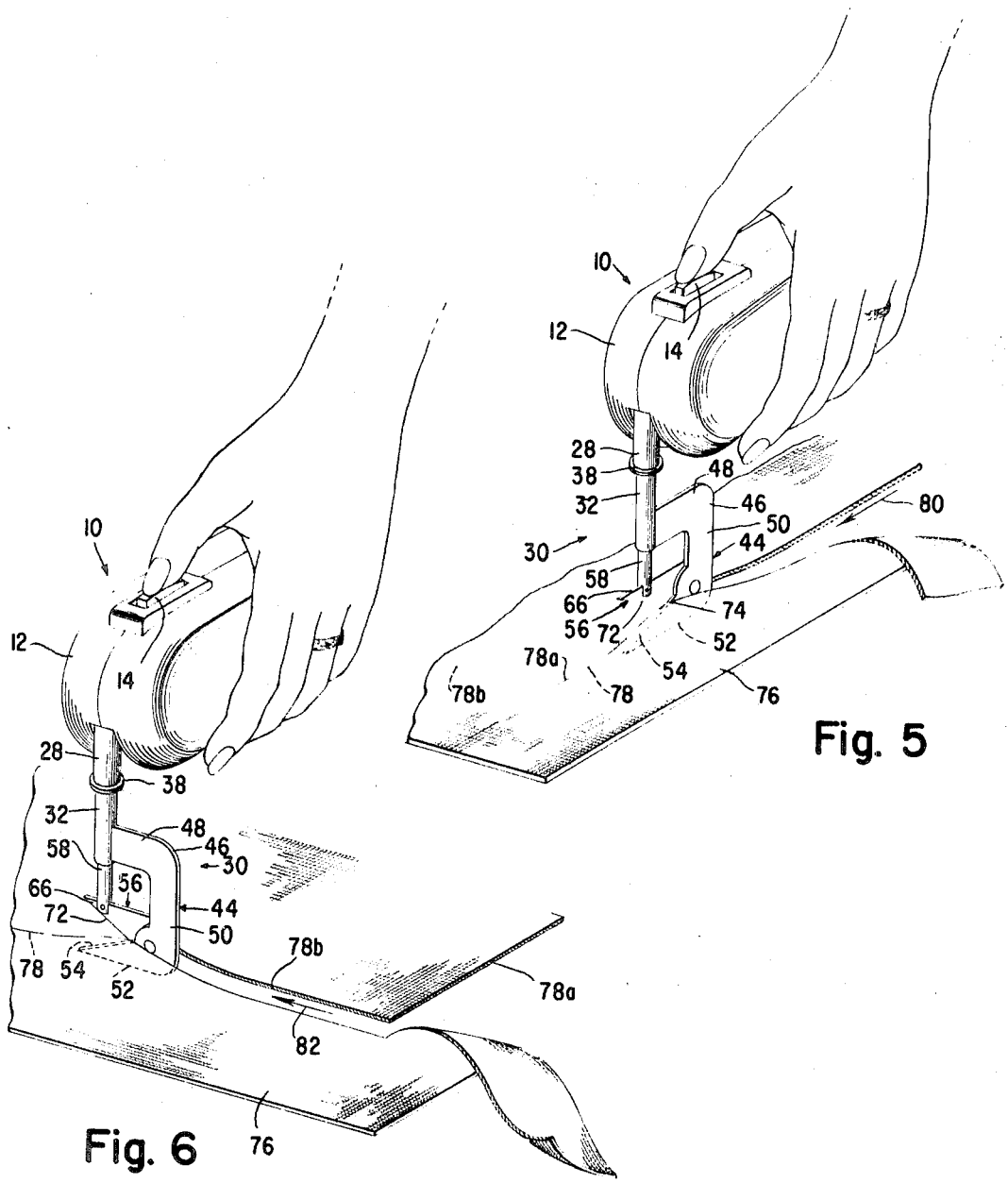
Fig. 5
Fig. 6
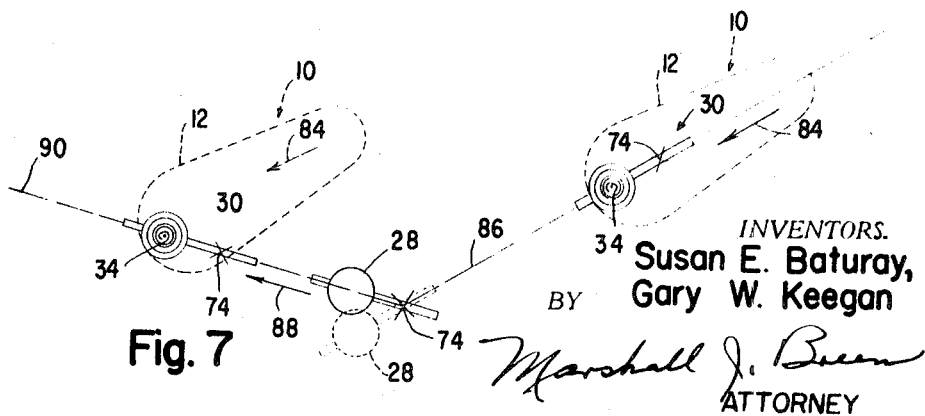
Fig. 7
INVENTORS.
Susan E. Baturay,
BY Gary W. Keegan
Marshall J. Breen
ATTORNEY

PORTABLE ELECTRIC SHEARING DEVICES

BACKGROUND OF THE INVENTION

Heretofore portable electric shearing devices, commonly termed electric scissors, had to manually manipulated in order to make cuts which deviated from a straight line. Requiring the whole electric scissor to be turned resulted in excessive operator fatigue and frequently required the operator to change position in order to accomplish the desired cut.

SUMMARY OF THE INVENTION

In accordance with the present invention the novel portable electric shearing device or electric scissors has a housing in which an electric motor is mounted to actuate one of a pair of coacting blades extending from the housing. Each of the blades is capable of rotating about an axis of rotation, and the coacting cutting edges thereof are offset from said axis. During the cutting operation the blades will turn corresponding to the direction of cutting so as to keep the point of cutting continuously behind the axis of rotation.

It is therefore an object of the present invention to provide an improved electric scissor which overcomes the prior art disadvantages; which is simple, reliable and economical; which permits pivotal mounting of the scissor blades having an offset cutting point for automatically cutting in the direction in which the electric scissor is pushed, whether it be linear or nonlinear and, which is capable of making cuts corresponding to the operator guided direction of the electric scissors without requiring bodily turning thereof.

Other objects and advantages will be apparent from the following description of one embodiment of the invention and the novel features will be particularly pointed out hereinafter in the claims.

BRIEF DESCRIPTION OF THE DRAWINGS

This invention is illustrated in the accompanying drawings in which:

FIG. 1 is a longitudinal elevational view of an electric scissor embodying the present invention;

FIG. 2 is a schematic representation of a perspective view, partly in section, of the electric scissors embodying the present invention;

FIG. 3 is a partial schematic representation of the scissor blade; assembly of the present invention;

FIG. 4 is a transverse sectional view taken along line 4—4 of FIG. 1;

FIG. 5 is a perspective view of the electric scissors embodying the present invention during cutting along a prescribed path;

FIG. 6 is a perspective view of the electric scissors cutting along the prescribed path which is now perpendicular to the path shown in FIG. 5.

FIG. 7 is a top plan view illustrating the electric scissors of the present invention during a cutting operation which includes a change in the line of cutting.

DESCRIPTION OF THE INVENTION

The novel electric scissors shown in FIG. 1, designated generally as 10, can be embodied in any otherwise conventional portable electric shearing device having a housing 12 to which an operator-actuated switch 14 energizes an electric motor mounted in the housing 12 and connected to a suitable source of electric power (not shown). One type of conventional electric power means is depicted in FIG. 2, namely an electric vibratory motor designated generally as 16 which will be suitably mounted withing the housing 12. The vibratory motor 16 includes an E-shaped laminated core 18 of soft iron, about the middle leg of which is wound a coil of wire 20, connected through the switch 14 to the line current. When an alternating current is supplied to the coil windings 20, a magnetic field will be created to alternately attract and repel an armature 22 resiliently suspended by a spring member 24 above the open end of the laminated core 18. The spring member 24 is sufficiently resilient so that the armature 22 will partake of a vibrating motion when the coil winding 20 is energized. This will produce a reciprocating motion at the free end 26 of the armature 22.

Projecting from a sleeve 28 formed in the lower front portion of the housing 12 is a scissor blade assembly, designated generally as 30, illustrated in FIGS. 2 and 3. The sleeve 28 serves the dual function of journaling a pivotally mounted tubular section 32 and defining the axis of rotation 34 about which the tubular section 32 is free to turn. The tubular section 32 is held captive within the sleeve 28 by an outwardly turned flange 36 which prevents the tubular portion 32 from passing downwardly through the sleeve 28. On the underside of the sleeve 28 a split ring clamp 38 is disposed within a peripheral groove 40 of the tube portion 32 so as to prevent vertical movement of said tube relative to the sleeve 28. The inner diameter of the sleeve 28 is equal to or slightly larger than the outer diameter of the tube portion 32 and acts to journal the tube portion 32 and facilitate its turning movement about the axis of rotation 34. The axis of the tube portion 32 is coincident to the axis of rotation 34. The tube portion 32 has a centrally disposed longitudinal aperture 42 which extends through the full length thereof. The tube portion 32 is part of a stationary blade 44 which also includes an offset blade portion which has an upper leg 48, a vertical leg 50 and a lower leg 52 each integrally formed. The upper and lower legs 48 and 52 are parallel. The upper leg 48 extends outwardly from the bottom of the tube portion 32 to turn into the vertical leg 50 disposed below the tubular portion 32 and which turns into the lower leg 52 which has an upper inclined surface defining a cutting edge 54. The offset blade portion 46 is formed in a vertical plane which intersects the axis of rotation 34.

A reciprocal blade 56 coacts with the stationary blade 44 to form the scissor blade assembly 30. The reciprocal blade 56 shown in FIGS. 2, 3 and 4 includes an actuating arm 58 and a vibrating blade 66 connected thereto. The actuating arm 58 has a diameter smaller than that of the aperture 42 through which it extends without contacting the same. The upper end of arm 58 is rotatably affixed to the free end 26 of the armature 22 by a pair of split ring clamps 60 disposed on either side of the armature 22 to be engaged within annular grooves 62 formed in the arm 58. The arm 58 has a slotted lower end which is pin connected at 64 to one end of a vibrating blade 66. The other end of the vibrating blade 66 is pivotally connected to the vertical leg 50 of the offset blade portion 46 of the stationary blade 44 by a screw end nut assembly 68 which maintains proper tension between the vibrating blade 66 and the stationary blade 44 by a spring 70 which biases the coacting blades against each other. The vibrating blade 66 has a lower cutting edge inclined in a direction opposite from that of cutting edge 54, and as best seen in FIG. 3 the vibratory or reciprocal motion of the actuating arm 58 will pivot the vibrating blade 66 with respect to the stationary blade 44 and cause the respective cutting edges 72 and 54 to come in coacting contact along a cutting area of short length, designated generally as 74. The cutting area 74 is offset from the axis of rotation 34, and as explained more fully hereinafter will continuously be behind the same during operation of the electric scissors and while cutting along a linear, nonlinear or otherwise irregular cutting path. The vibrating blade 66 of the reciprocal blade 56 lies in a plane substantially parallel to that of the offset portion 46 of the stationary blade 44, and due to the rotatable connection of the arm 58 which drives the same the vibratory blade 66 and the stationary blade 44 will simultaneously turn about the axis of rotation 34 responsive to the direction in which the electric scissors is guided by the operator.

The housing 12 of the electric scissors 10 is small enough to be held by the hand of the operator as illustrated in FIGS. 5 and 6 and as an added safety feature may use a switch 14 which is spring biased into an open position and must be finger depressed to actuate the motor 16. This type of switch 14 is commonly referred to as a "dead man" switch, but of course the conventional on-off switch could also be used. Referring to FIGURE 5 the electric scissors 10 is shown cutting a fabric 76 along a path indicated by the dashed line 78 having a first linear portion 78A and a second linear portion 78B perpendicular to the first linear portion. The operator will guide the electric scissors 10 in a direction indicated by the arrow 80 which is parallel to the cutting line 78A. In this position both the longitudinal line of the housing 12 and the vertical plane in which the stationary blade 44 and vibratory blade 66 lie are each parallel to the direction in which the electric scissors 10 is being pushed as represented by the arrow 80. However, upon reaching and turning the corner to cut along the line 78B, the electric scissors 10 will now be pushed in the direction indicated by the arrow 82. In this instance as illustrated in FIG. 6 the housing 12 of the electric scissors 10 need not be changed from the position shown in FIG. 5 since the scissor blade assembly 30 is free to rotate and continuously maintain a position parallel to the direction in which the electric scissors is being pushed. Accordingly, the scissor blade assembly 30 assumes a position parallel to the arrow 82 so as to cut along the cutting line 78B. The same would be the case if the line of cut were arcuate or irregular or for that matter in any cutting direction. For example if the cutting line were a curve then the direction in which the electric scissors is pushed would be tangent to the curve and the cutting action of the blade assembly 30 also would be tangent thereto. This added flexibility is very desirable as for example in cutting out patterns since the operator can maintain a fixed hand position during the entire cutting operation of the fabric. The fact that the scissor blade assembly 30 is free to rotate, swivel or turn about the axis of rotation 34 is shown in FIGURE 7 wherein the electric scissor 10 is guided in a direction indicated by the arrow 84 to cut along a cutting line 86 wherein the longitudinal extent of the housing 12 and the scissor blade assembly 30 is substantially parallel to the arrow 84. As previously noted the cutting area 74 is offset from the axis of rotation 34 and continuously behind the same with respect to the direction of cut. Upon reaching a turning point or a change in direction the cutting area 74 serves as a center-of-drag so as to permit the scissor blade assembly 30 to pivot with respect to the electric scissors 10 whereby the blade assembly 30 pivots within the housing 12 to assume a new position, which position is again behind the axis of rotation 34 and parallel to the new direction along which the electric scissors is being pushed as represented by the arrow 88. There is no requirement to turn the housing 12 to correspond with the new line of cut 90 so that the electric scissors 10 may be kept in a position parallel to its original position as indicated by the dashed arrow 84.

FIG. 7 is an illustration in which an electric scissors 10 is shown cutting along lines 86 and 90 without the need of turning the electric scissors 10. If this same cut were made by a conventional electric scissors the change in the direction along which the scissors was pushed as indicated by arrows 84 and 88 would require the entire electric scissors to be turned corresponding to the cutting line. The practice of the present invention permits the electric scissors to be held in a single position in which the scissor blade assembly 30 will automatically be aligned to cut in the respective direction indicated by the arrows 84 and 88 that the electric scissors 10 is pushed. In this way the cutting action follows a prescribed path and a change in the direction of push from that indicated by arrow 84 to that indicated by arrow 88 produces a drag at the cutting point 74 where the lines 86 and 90 intersect which causes the scissor blade assembly 30 to turn correpondingly about the axis or rotation 34 so as to continuously maintain the cutting along the prescribed path. The offset distance measured from the axis of rotation 34 to the cutting area 74 provides a sufficient lever arm to permit quick response to any change in direction that the electric scissors 10 is pushed, while also providing sufficient frictional drag to prevent oversawying or misalignment of the prescribed cutting path along the lines 86 and 90.

It will be understood that various changes in the details, materials, arrangements or parts and operating conditions which have been herein described and illustrated in order to explain the nature of the invention may be made by those skilled within the principles and scope of the invention.

Having thus set forth the nature of the invention, what is claimed herein is:

1. A portable electric shearing device comprising:
   a. a housing,
   b. electric powers means mounted in the housing,
   c. a stationary blade pivotally connected to the housing to define an axis of rotation,
   d. a vibratory blade means operatively connected to be actuated by the electric power means, and
   e. the vibratory blade and the stationary blade to form coacting cutting surfaces offset from said axis of rotation and continuously behind said axis with respect to the direction of cutting.

2. The combination claimed in claim 1 wherein:
   a. the stationary blade includes a tubular portion and an offset blade portion affixed to the tubular portion,
   b. the vibratory blade means includes an actuating arm extending through the tubular portion of the stationary blade, and a blade portion connected to the actuating arm,
   c. the tubular portion and the actuating arm have coincident axes lying along the axis of rotation, and
   d. the blade portions of the stationary blade and the vibratory blade pivotally connected to each other remote from the axis of rotation whereby the coacting cutting surfaces thereof are intermediately disposed.

3. In a hand held portable electric scissors the combination of:
   a. a housing,
   b. a pair of coacting scissor blades, one being stationary and the other being reciprocal with respect to cutting,
   c. an electrically actuated power means connected to the reciprocal blade to reciprocate the same,
   d. the stationary blade pivotally connected to the housing along an axial line defining an axis of rotation,
   e. the stationary blade having an aperture coincident to the axis of rotation,
   f. the reciprocal blade having a portion extending through said aperture and connected to rotate with the stationary blade about the axis of rotation, and
   g. the pair of scissor blades connected to each other to form cutting edges continuously behind the axis of rotation.

4. The combination claimed in claim 3 wherein:
   a. the stationary blade includes an apertured connecting portion and an offset blade portion affixed thereto,
   b. the offset blade portion extends radially outwardly of the axis of rotation and downwardly from the connecting portion to turn toward said axis and extend perpendicular thereto, and
   c. the reciprocal blade includes an actuating arm extending through said aperture and pivotally connected to one end of the blade with the other end of the blade pivotally connected to the blade portion of the stationary blade remote from the axis of rotation.